(12) United States Patent
Burugula et al.

(10) Patent No.: US 10,055,274 B2
(45) Date of Patent: *Aug. 21, 2018

(54) AUTOMATED DIAGNOSIS OF SOFTWARE CRASHES

(71) Applicant: International Business Machines Corporation, Armonk, NY (US)

(72) Inventors: Ramanjaneya S. Burugula, Yorktown Heights, NY (US); Kaoutar El Maghraoui, Yorktown Heights, NY (US); Joefon Jann, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/206,353

(22) Filed: Jul. 11, 2016

(65) Prior Publication Data
US 2016/0321126 A1  Nov. 3, 2016

Related U.S. Application Data

(63) Continuation of application No. 14/515,934, filed on Oct. 16, 2014, now Pat. No. 9,436,540.

(51) Int. Cl.
| | |
|---|---|
| *G06F 11/00* | (2006.01) |
| *G06F 11/07* | (2006.01) |
| *G06F 17/30* | (2006.01) |
| *G06F 11/36* | (2006.01) |

(52) U.S. Cl.
CPC ........ *G06F 11/079* (2013.01); *G06F 11/0706* (2013.01); *G06F 11/0715* (2013.01); *G06F 11/0751* (2013.01); *G06F 11/0778* (2013.01); *G06F 11/0787* (2013.01); *G06F 17/30958* (2013.01); *G06F 11/0766* (2013.01); *G06F 11/3636* (2013.01)

(58) Field of Classification Search
CPC ............... G06F 11/079; G06F 11/3636; G06F 11/0366; G06F 11/0766
See application file for complete search history.

(56) References Cited

U.S. PATENT DOCUMENTS

| | | | |
|---|---|---|---|
| 8,578,213 B2 | 11/2013 | Han et al. | |
| 9,436,540 B2 | 9/2016 | Burugula et al. | |
| 2004/0205327 A1* | 10/2004 | Morrison | ............ G06F 11/0748 713/1 |

(Continued)

OTHER PUBLICATIONS

IBM, "List of IBM Patents or Patent Applications Treated as Related", Appendix P, 2 pages, dated Dec. 14, 2017.

*Primary Examiner* — Charles Ehne
(74) *Attorney, Agent, or Firm* — John W. Hayes; William H. Hartwell (57) ABSTRACT

A method for diagnosing software crashes includes calculating, using vector space modeling, angles between vectors representing stack-traces from reports in a repository on one or more server computer systems, to define similarities in the reports, wherein reports are deemed similar where angles between their respective vectors are less than a threshold value. The method further includes grouping the reports into similar sets using a maximal cliques process and automatically diagnosing, in response to a received software crash, a first stack-trace extracted from a first report of the received software crash, to determine a potential solution to the received software crash.

20 Claims, 4 Drawing Sheets

(56) References Cited

U.S. PATENT DOCUMENTS

| | | |
|---|---|---|
| 2004/0205420 A1* | 10/2004 | Seeley ............... G06F 11/0724 714/57 |
| 2005/0102567 A1 | 5/2005 | McGuire et al. |
| 2005/0289404 A1* | 12/2005 | Maguire ............ G06F 11/0748 714/57 |
| 2007/0283338 A1 | 12/2007 | Gupta et al. |
| 2013/0031094 A1 | 1/2013 | Kozak |
| 2013/0227350 A1 | 8/2013 | O'Riordan et al. |
| 2013/0262936 A1 | 10/2013 | Elliott et al. |

* cited by examiner

AUTOMATED DIAGNOSIS OF SOFTWARE CRASHES

BACKGROUND

The present invention relates generally to the field of operating system (OS) maintenance and service, and more particularly to improved diagnosis of operating system or application software crashes.

Operating system (OS) crashes can result in significant monetary or operational losses in enterprise businesses and financial institutions. Operational losses may include the loss of all application services, data services, and the entire delivery chain of products and/or services provided by a business. When an OS or an application crash occurs, diagnostic data is needed to help identify the root cause of the problem, and to help find a solution. Technical support personnel and developers use stack-trace files to manually determine where the exception occurred for the failing thread/process. A stack-trace, in computing, is a report of the active stack frames at a certain point during the execution of a computer program. In other words, it is the list of function calls that the current thread/process was executing when an exception occurs. A thread is an execution stream within a process with its own stack, local variables, and program counter. There may be one or more execution streams in a process. Typically, technical support personnel search for similar known problems in a prior problems database for applicable solutions and developers try to manually determine the faulting function name and offset of the exception by analyzing registers, memory content, checking for reasonable outcomes during execution, and backtracking the stack-trace while reading the source code for each function in the stack-trace. A register is a small amount of high speed memory available as part of a Central Processing Unit (CPU) or a hardware-thread of a CPU, designed to speed up its operations by providing quick access to commonly used values.

SUMMARY

Embodiments in accordance with the present invention disclose a method, computer program product, and system for diagnosing software crashes. A method includes calculating, using vector space modeling, angles between vectors representing stack-traces from reports in a repository on one or more server computer systems, to define similarities in the reports, wherein reports are deemed similar where angles between their respective vectors are less than a threshold value. The method further includes grouping the reports into similar sets using a maximal cliques process and automatically diagnosing, in response to a received software crash, a first stack-trace extracted from a first report of the received software crash, to determine a potential solution to the received software crash.

A computer program product for diagnosing software crashes includes one or more computer-readable storage media and program instructions stored on at least one of the one or more storage media, the program instructions comprising program instructions to calculate, using vector space modeling, angles between vectors representing stack-traces from reports in a repository on one or more server computer systems, to define similarities in the reports, wherein reports are deemed similar where angles between their respective vectors are less than a threshold value. The computer program product further includes program instructions to group the reports into similar sets using a maximal cliques process and automatically diagnose, in response to a received software crash, a first stack-trace extracted from a first report of the received software crash, to determine a potential solution to the received software crash.

A computer system for diagnosing software crashes includes one or more computer processors and one or more computer readable storage media. Program instructions are stored on the computer readable storage media for execution by at least one of the one or more computer processors, the program instructions comprising program instructions to calculate, using vector space modeling, angles between vectors representing stack-traces from reports in a repository on one or more server computer systems, to define similarities in the reports, wherein reports are deemed similar where angles between their respective vectors are less than a threshold value. The computer system further includes program instructions to group the reports into similar sets using a maximal cliques process and automatically diagnose, in response to a received software crash, a first stack-trace extracted from a first report of the received software crash, to determine a potential solution to the received software crash.

DETAILED DESCRIPTION

Embodiments in accordance with the present invention recognize that software crashes may be quickly diagnosed by grouping existing software crashes into groups called cliques of similar problems based on their stack-traces, then identifying a similar problem by searching those cliques of stack-traces when a new software crash occurs. OS crashes can result in significant monetary and operational losses in enterprise businesses and financial institutions. An OS crash results in the loss of all application services and/or data services. IT disruptions can affect the entire delivery chain of products and/or services provided by a business. OS crashes are reported to OS-vendors in the form of crash reports. Crash reports contain the crash details and often include data such as stack-traces, type of crash, the program function causing the crash, the OS version and release. An OS, e.g., AIX, UNIX, or Linux™, kernel crash dump file containing a stack-trace, and Java™ JVM snap trace are examples of files that can be used to determine the cause of the crash. When an OS crash is reported to an OS-vendor, technical support personnel are required to manually search for similar incident on various large databases. Quickly diagnosing an OS crash to find its root cause and finding known solutions that have been applied to similar problem instances, in order to reduce downtimes is critical in any enterprise business environment.

Figure 1:
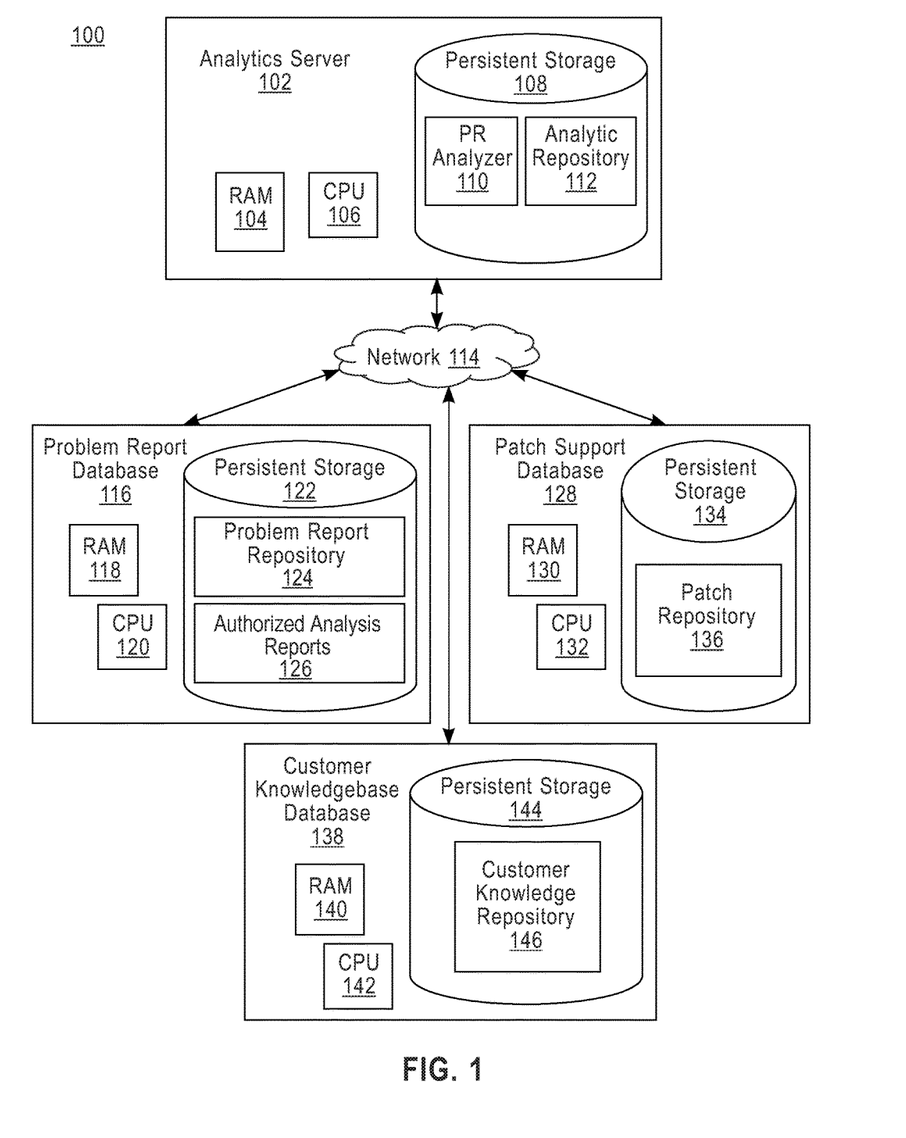
FIG. 1 is a functional block diagram illustrating an OS diagnostic environment, in an embodiment in accordance with the present invention.

Embodiments in accordance with the present invention will now be described in detail with reference to the Figures. FIG. 1 is a functional block diagram, generally depicted by the numeral 100, illustrating an OS diagnostic environment, in an embodiment in accordance with the present invention. Analytics server 102 includes Random Access Memory (RAM) 104, central processing unit 106, and persistent storage 108. Persistent storage 108 may, for example, be a hard disk drive. Problem report (PR) analyzer 110 and analytic repository 112 are stored in persistent storage 108, which includes operating system software as well as software that enables analytics server 102 to communicate with problem report database 116, patch support database 128, and customer knowledgebase database 138 over a data connection on network 114. In other embodiments, problem report database 116, patch support database, and customer knowledgebase database 138 may be repositories or other storage devices capable of storing data such as crash reports, patches, and knowledgebase repositories e.g., IBM® Post Sales Database (PSdb), IBM® Support Fix Central Database, and IBM® Enhanced Customer Repository (ECuRep). In other embodiments, PR analyzer 110 and analytic repository 112 could be stored in separate server computer systems.

In FIG. 1, network 114 is shown as the interconnecting fabric between analytics server 102, problem report database 116, patch support database 128, and customer knowledgebase database 138. In practice, the connection may be any viable data transport network, such as, for example, a LAN or WAN. Network 114 can be, for example, a local area network (LAN), a wide area network (WAN) such as the Internet, or a combination of the two, and include wired, wireless, or fiber optic connections. In general, network 114 can be any combination of connections and protocols that will support communications between analytics server 102, problem report database 116, patch support database 128, and customer knowledgebase database 138 in accordance with a desired embodiment of the invention.

Problem report database 116 also contains RAM 118, central processing unit 120, and persistent storage 122 such as a hard disk drive. Problem report (PR) repository 124 and authorized analysis report (AAR) database 126 is stored in persistent storage 122, including operating system software as well as software that enables problem report database 116 to communicate with analytics server 102 over a data connection on network 114. A PR may be, for example, a customer problem management record, which is a document used to manage any technical product issue that a customer reports to a software vendor. Once created, the PR will be assigned a unique number which is communicated in real-time to the customer. Each time a software vendor support analyst updates a PR, the customer will receive an e-mail notifying them of the update. When necessary, the customer should respond with any information, data, or further questions they may have related to the reported issue.

An AAR is a formal report from the software or OS-vendor development-team of a problem caused by a suspected defect in a current release of a software/OS-vendor program. If the software/OS-vendor development-team is able to confirm the existence of the defect, they will update the AAR with any known workarounds. Additionally, an indication of a future release, if any, of the software/OS-vendor program targeting a formal fix for the defect as well as a patch or Program Temporary Fix (PTF), if planned, may be included. The AAR will then be published and visible to supported customers. In one embodiment, problem report database 116, typically a server with large amounts of storage, is capable of communicating with analytics server 102 via network 114. In other embodiments, problem report database 116 may consist of multiple server computer system repositories capable of communicating with analytics server 102 via network 114.

Patch support database 128 also contains RAM 130, central processing unit (CPU) 132, and persistent storage 134 such as a hard disk drive. Patch repository 136 is stored in persistent storage 134, including operating system software as well as software that enables patch support database 128 to communicate with analytics server 102 over a data connection on network 114. In other embodiments, patch repository 136 may be used to store computer program fixes in the form of executable files or in the form of source code consisting of textual differences between two source code files. In other embodiments, patch support database 128 may consist of multiple server computer repositories capable of communicating with analytics server 102 via network 114.

Customer knowledgebase database 138 also contains RAM 140, central processing unit 142, and persistent storage 144 such as a hard disk drive. Customer knowledge repository 146 is stored in persistent storage 144, including operating system software as well as software that enables customer knowledgebase database 138 to communicate with analytics server 102 over a data connection on network 114. In another embodiment, customer knowledgebase database 138 may consist of multiple server computer repositories, containing large amounts of storage, capable of communicating with analytics server 102 via network 114.

Figure 2:
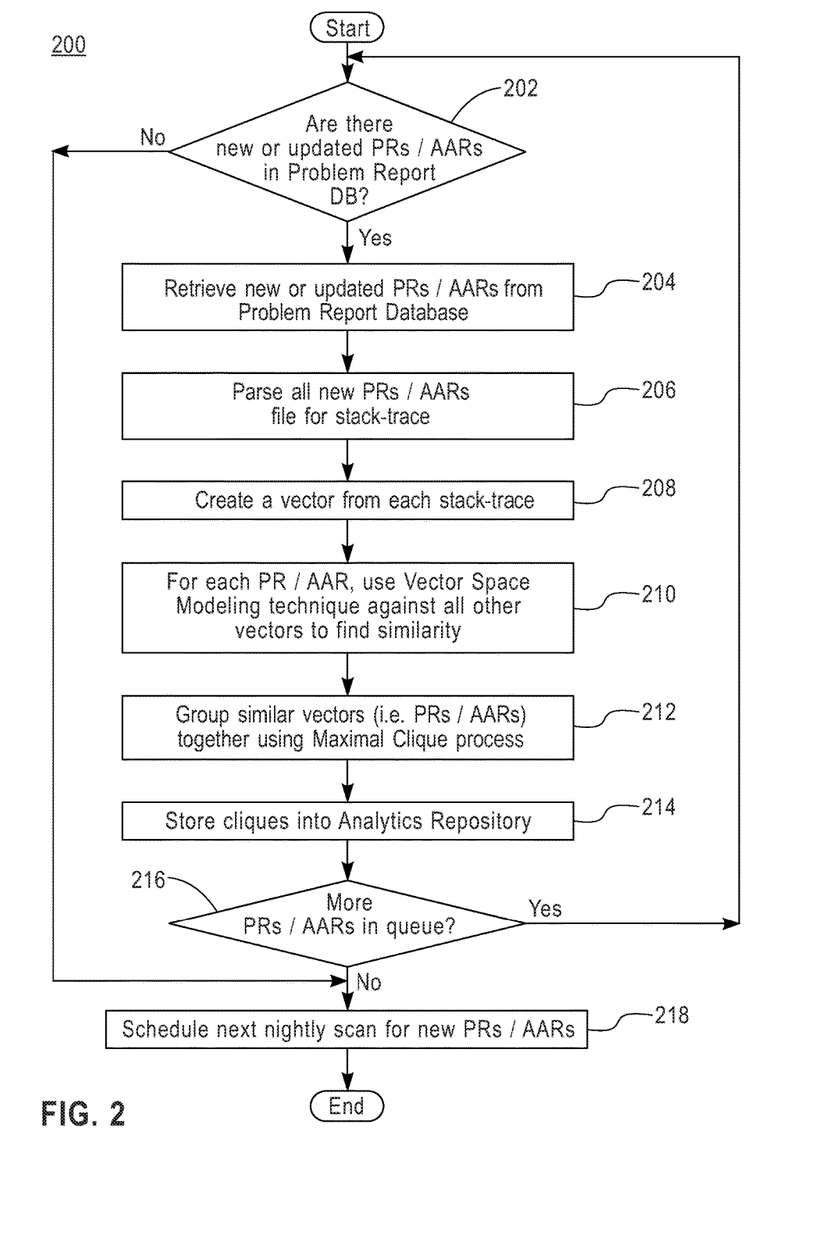
FIG. 2 is a flowchart illustrating operational steps for batch processing of new or modified problem reports and authorized analysis reports of crashed software instances, in an embodiment in accordance with the present invention.

FIG. 2 is a flowchart, generally depicted by the numeral 200, illustrating operational steps for batch processing of new or modified problem reports and authorized analysis reports of crashed software instances, in an embodiment in accordance with the present invention. In one embodiment, this process is performed during off-peak hours due to the large amounts of data being processed and transferred to analytics server 102. In other embodiments, this process could be performed at any time. In other embodiments, PR analyzer 110 may be used to diagnose application program dumps for software programs that abnormally end or crash.

PR analyzer 110 checks problem report database 116 for new or updated PRs in PR repository 124 and AARs in AAR DB 126 as indicated in decision 202. If new or updated PRs or AARs exist in PR repository 124 or AAR DB 126 ("yes" branch, decision 202), PR analyzer 110 retrieves the new or updated PRs or AARs from PR repository 124 and AAR DB 126 as shown in step 204. If there are no new or updated PRs in PR repository 124 or AARs in AAR DB 126 ("no" branch, decision 202), PR analyzer 110 bypasses steps 204 through decision 216. In step 206, PR analyzer 110 parses all new PR and AAR files in PR repository 124 and AAR DB 126 to extract the associated stack-traces. In step 208, PR analyzer 110 then creates vectors from the stack-traces using the faulting function name and offset of the exception that caused the crash, and stores those vectors in analytics server 102. A vector is a mathematical structure formed by a collection of elements, which may be added together and multiplied by numbers. PR analyzer 110 uses each of the program function-names as a distinct dimension and the offset within the associated function as the length of the vector.

PR analyzer 110 applies a text mining technique called Vector Space Modeling to each PR or AAR to find similarity between the set of vectors stored in the analytics server as shown in step 210. Vector Space Modeling is an algebraic model for representing text documents, or any object in general, as vectors of identifiers. Every distinct term in a document constitutes a dimension. For each document, the frequency of that term is the length of the vector in that dimension, i.e., each document is represented as a multi-dimensional vector. In an embodiment in accordance with the present invention, the stack traces, rather than term frequencies, are used to create the vectors. The angle between two vectors is then computed. Two vectors are defined as similar if the angle between the two vectors is below a user-specified value. For example, one can define two PRs or AARs to be similar when the angle between the corresponding two vectors is less than one degree. A difference angle threshold of one degree is an empirically derived value that has been determined to provide acceptable performance, although it is conceivable that other difference angles may also provide acceptable performance, or even improved performance in some contexts.

In step 212, PR analyzer 110 then groups similar PRs and AARs together in cliques using the Maximal Cliques process in Undirected Graphs. In the mathematical field of graph theory, a clique in an undirected graph is a subset of its vertices such that every two vertices in the subset are connected by an edge. Vertices are also called nodes or points. A maximal clique is a clique that does not exist exclusively within the vertex set of a larger clique. PR analyzer 110 classifies a pair of PRs or AARs as similar if the angle between the PRs or AARs is less than or equal to a user-specified and fixed threshold. Angles greater than the user-specified fixed threshold are classified as dissimilar by PR analyzer 110 and another pair is selected. When the vertices of two PRs or AARs are classified as similar, an edge is added by PR analyzer 110 to connect the PRs or AARs. Every maximal clique represents a maximally-connected set of vertices, i.e., similar PRs or AARs. Each PR and AAR is represented by a vertex. If two PRs or AARs are determined to be similar by the above described vector space modeling, PR analyzer 110 connects the PRs or AARs by an edge to form a graph. PR analyzer 110 then extracts the separate component sub-graphs from the graph and the maximal clique is determined. Each maximal clique represents a set of similar PRs and AARs.

In step 214, PR analyzer 110 stores the cliques into analytic repository 112. PR analyzer 110 then checks problem report database 116 for new or updated PRs in PR repository 124 and AARs in AAR DB 126 again, as seen in decision 216. If additional new or updated PRs or AARs exist in the queue ("yes" branch, decision 216), PR analyzer 110 repeats the process and returns to step 202. If there are no additional new or updated PRs in PR repository 124 or AARs in AAR DB 126, ("no" branch, decision 216), PR analyzer 110 continues on to step 218. In step 218, PR analyzer 110 schedules the next user determined scan for new or updated PRs in PR repository 124 and AARs in AAR DB 126 on problem report database 116.

Figure 3:
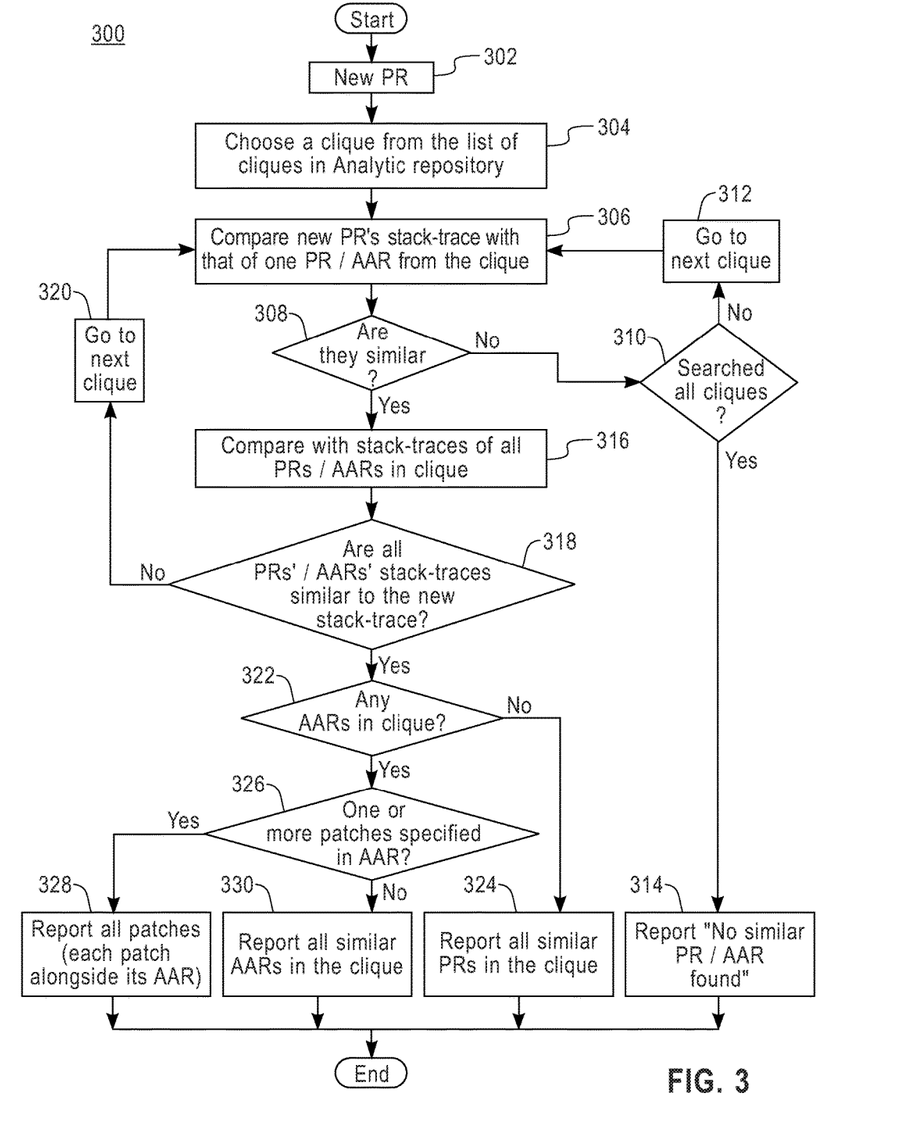
FIG. 3 is a flowchart illustrating operational steps for real-time processing of a new problem report of a software crash with a stack-trace, in an embodiment in accordance with the present invention.

FIG. 3 is a flowchart, generally depicted by the numeral 300, illustrating operational steps for real-time processing of a new problem report of a software crash with a stack-trace, in an embodiment in accordance with the present invention. Problem report database 116 receives a new PR in PR repository 124 or AAR in AAR DB 126 as depicted in step 302 and passes the information to PR analyzer 110. PR analyzer 110 then parses the new PR or AAR to extract the stack-trace. In step 304, PR analyzer 110 chooses a clique from the list of cliques in the analytic repository 112 and compares the vector of the new stack-trace to existing vector of one of the stack-traces in the clique as depicted in step 306. PR analyzer 110 then checks to see if the stack-traces are similar, decision 308. If the stack-traces are not similar ("no" branch, decision 308), PR analyzer 110 determines if all cliques in analytic repository 112 have been searched, as seen in decision 310. If all cliques were searched ("yes" branch, decision 310), PR analyzer 110 reports no similar PR or AAR were found to system administrators via email or other digital forms of communication, as seen in step 314. If all cliques in analytic repository 112 were not searched ("no" branch, decision 310), PR analyzer 110 goes on to the next clique, as seen in step 312.

If the stack-traces are similar ("yes" branch, decision 308), PR analyzer 110 compares the stack-traces of all the PRs and AARs in that clique as seen in step 316. In decision 318, PR analyzer 110 determines if all the PR and AAR stack-traces are similar to the new stack-trace. If not ("no" branch, decision 318), PR analyzer 110 moves to the next clique as seen in step 320. If all PRs and AARs match the new stack-trace ("yes" branch, decision 318), PR analyzer 110 checks to see if there are any AARs in the clique as seen in decision 322. If no AARs exist in the clique ("no" branch, decision 322), PR analyzer 110 reports all similar PRs in the clique to system administrators via email or other digital forms of communication and logs the results to customer knowledge repository 146 as shown in step 324. If there are any AARs in the clique ("yes" branch, decision 322), PR analyzer 110 then determines if there are any patches specified in the AAR and stored in patch repository 136 as illustrated in decision 326. If there are no patches specified in the AAR ("no" branch, decision 326), PR analyzer 110 reports all the similar AARs in the clique to system administrators via email or other digital forms of communication and logs the results to customer knowledge repository 146 as seen in step 330. If patches are specified in the AAR ("yes" branch, decision 326), PR analyzer 110 reports all the patches contained in patch repository 136, with each alongside its AAR, to system administrators via email or other digital forms of communication and logs the results to customer knowledge repository 146 as shown in step 328.

Figure 4:
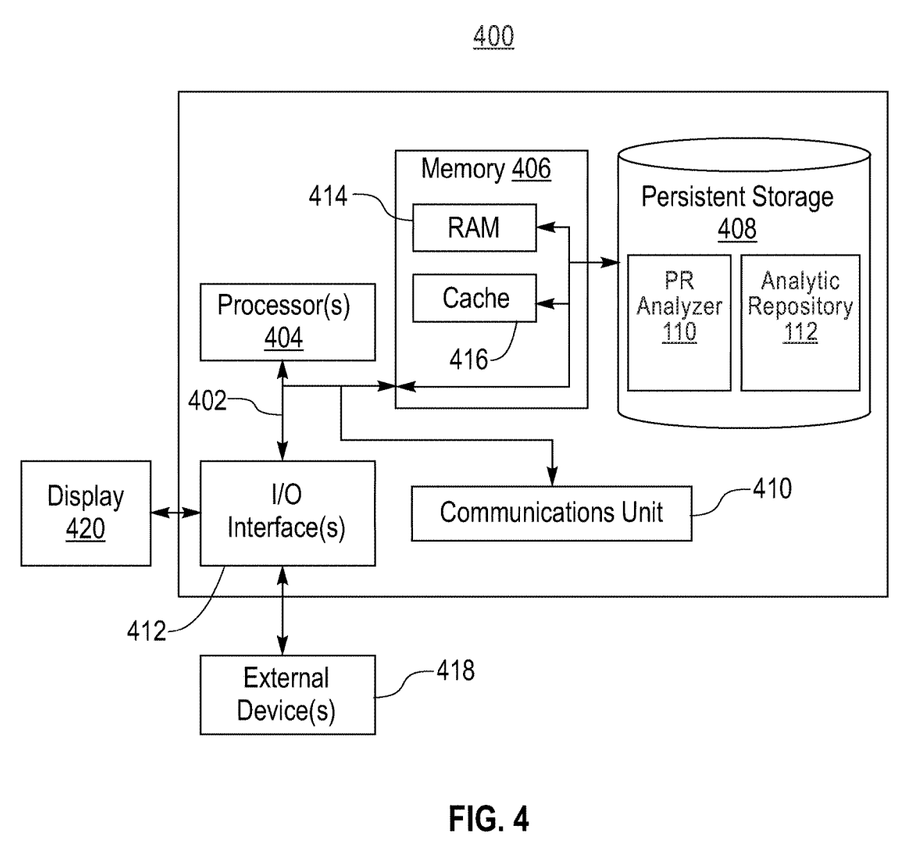
FIG. 4 is a functional block diagram of a computer system, in an embodiment in accordance with the present invention.

FIG. 4 depicts a block diagram, generally depicted by the numeral 400, of components of analytics server 102 in an embodiment in accordance with the present invention. It should be appreciated that FIG. 4 provides only an illustration of one implementation and does not imply any limitations with regard to the environments in which different embodiments may be implemented. Many modifications to the depicted environment may be made.

Analytics server 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

PR analyzer 110 and analytic repository 112 are stored in persistent storage 408 for execution and/or access by one or more of the respective computer processors 404 via one or more memories of memory 406. In this embodiment, persistent storage 408 includes a magnetic hard disk drive.

Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of network 114 and problem report database 116, patch support database 128, and customer knowledgebase database 138. In these examples, communications unit 410 includes one or more network interface cards. Communications unit 410 may provide communications through the use of either or both physical and wireless communications links. PR analyzer 110 and analytic repository 112 may be downloaded to persistent storage 408 through communications unit 410.

I/O interface(s) 412 allows for input and output of data with other devices that may be connected to analytics Server 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., PR analyzer 110 and analytic repository 112, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for diagnosing software crashes, the method comprising:
    calculating, by one or more processors, using vector space modeling, angles between vectors representing stack-traces from reports in a repository on one or more server computer systems, to define similarities in the reports, wherein reports are deemed similar where angles between their respective vectors are less than a threshold value;
    grouping, by one or more processors, the reports into similar sets using a maximal cliques process; and
    automatically diagnosing, by one or more processors, in response to a received software crash, a first stack-trace extracted from a first report of the received software crash, to determine a potential solution to the received software crash.

2. The method of claim 1, wherein automatically diagnosing in response to the received software crash further comprises selecting the potential solution by searching the grouped reports for a stack-trace similar to the first stack-trace.

3. The method of claim 1, further comprising:
    retrieving, by one or more processors, a stack-trace from a report in the repository on the one or more server computer systems; and
    automatically creating, by one or more processors, a vector from the retrieved stack-trace, wherein each function name within the stack-trace is a dimension of the resultant vector, and the vector is associated with the report containing the stack-trace.

4. The method of claim 3, wherein retrieving a stack-trace from a report in the repository on the one or more server computer systems further comprises:
    scanning, by one or more processors, for at least one of a new problem report, updated problem report and authorized analysis report files; and
    parsing, by one or more processors, the stack-trace from the at least one of new problem report, updated problem report and authorized analysis report files.

5. The method of claim 1, wherein calculating, using vector space modeling, angles between the vectors further comprises:
    computing, by one or more processors, the angle between each pair of vectors; and
    determining, by one or more processors, if the angle between each pair of vectors is less than one degree.

6. The method of claim 1, wherein grouping the reports into similar sets using a maximal cliques process further comprises:
    creating, by one or more processors, an undirected graph wherein a vertex represents each report;
    connecting, by one or more processors, a pair of reports, determined to be similar, by an edge;
    extracting, by one or more processors, one or more separate connected component subgraphs from the undirected graph;
    determining, by one or more processors, a maximal clique for each subgraph, wherein each maximal clique represents a set of similar reports;
    grouping, by one or more processors, the reports contained in the maximal clique together; and
    storing, by one or more processors, cliques into a repository.

7. The method of claim 1, wherein automatically diagnosing, in response to the received software crash, the first stack-trace extracted from the first report of the software crash, to determine a potential solution to the received software crash, further comprises:
    extracting, by one or more processors, the first stack-trace from the first report;
    identifying, by one or more processors, a set of reports from the grouped reports that have a similar stack-trace to the extracted first stack trace; and
    selecting, by one or more processors, a potential solution from among program temporary fixes associated with the similar stack trace.

8. A computer program product for diagnosing software crashes, the computer program product comprising:
    one or more computer readable storage media and program instructions stored on the one or more computer readable storage media, the program instructions comprising:
    program instructions to calculate, using vector space modeling, angles between vectors representing stack-traces from reports in a repository on one or more server computer systems, to define similarities in the reports, wherein reports are deemed similar where angles between their respective vectors are less than a threshold value;
    program instructions to group the reports into similar sets using a maximal cliques process; and program instructions to automatically diagnose, in response to a received software crash, a first stack-trace extracted from a first report of the received software crash, to determine a potential solution to the received software crash.

9. The computer program product of claim 8, wherein the program instructions to automatically diagnose in response to the received software crash further comprise program instructions to select the potential solution by searching the grouped reports for a stack-trace similar to the first stack-trace.

10. The computer program product of claim 8, further comprising:
program instructions to retrieve a stack-trace from a report in the repository on the one or more server computer systems; and
program instructions to automatically create a vector from the retrieved stack-trace, wherein each function name within the stack-trace is a dimension of the resultant vector, and the vector is associated with the report containing the stack-trace.

11. The computer program product of claim 10, wherein the program instructions to retrieve a stack-trace from a report in the repository on the one or more server computer systems further comprise:
program instructions to scan for at least one of a new problem report, updated problem report and authorized analysis report files; and
program instructions to parse the stack-trace from the at least one of new problem report, updated problem report and authorized analysis report files.

12. The computer program product of claim 8, wherein the program instructions to calculate, using vector space modeling, angles between the vectors further comprise:
program instructions to compute the angle between each pair of vectors; and
program instructions to determine if the angle between each pair of vectors is less than one degree.

13. The computer program product of claim 8, wherein the program instructions to group the reports into similar sets using a maximal cliques process further comprise:
program instructions to create an undirected graph wherein a vertex represents each report;
program instructions to connect a pair of reports, determined to be similar, by an edge;
program instructions to extract one or more separate connected component subgraphs from the undirected graph;
program instructions to determine a maximal clique for each subgraph, wherein each maximal clique represents a set of similar reports;
program instructions to group the reports contained in the maximal clique together; and
program instructions to store cliques into a repository.

14. The computer program product of claim 8, wherein the program instructions to automatically diagnose, in response to the received software crash, the first stack-trace extracted from the first report of the software crash, to determine a potential solution to the received software crash, further comprise:
program instructions to extract the first stack-trace from the first report;
program instructions to identify a set of reports from the grouped reports that have a similar stack-trace to the extracted first stack trace; and program instructions to select a potential solution from among program temporary fixes associated with the similar stack trace.

15. A computer system for diagnosing software crashes, the computer system comprising:
one or more computer processors;
one or more computer readable storage media;
program instructions stored on the computer readable storage media for execution by at least one of the one or more computer processors, the program instructions comprising:
program instructions to calculate, using vector space modeling, angles between vectors representing stack-traces from reports in a repository on one or more server computer systems, to define similarities in the reports, wherein reports are deemed similar where angles between their respective vectors are less than a threshold value;
program instructions to group the reports into similar sets using a maximal cliques process; and
program instructions to automatically diagnose, in response to a received software crash, a first stack-trace extracted from a first report of the received software crash, to determine a potential solution to the received software crash.

16. The computer system of claim 15, wherein the program instructions to automatically diagnose in response to the received software crash further comprise program instructions to select the potential solution by searching the grouped reports for a stack-trace similar to the first stack-trace.

17. The computer system of claim 15, further comprising:
program instructions to retrieve a stack-trace from a report in the repository on the one or more server computer systems; and
program instructions to automatically create a vector from the retrieved stack-trace, wherein each function name within the stack-trace is a dimension of the resultant vector, and the vector is associated with the report containing the stack-trace.

18. The computer system of claim 17, wherein the program instructions to retrieve a stack-trace from a report in the repository on the one or more server computer systems further comprise:
program instructions to scan for at least one of a new problem report, updated problem report and authorized analysis report files; and
program instructions to parse the stack-trace from the at least one of new problem report, updated problem report and authorized analysis report files.

19. The computer system of claim 15, wherein the program instructions to calculate, using vector space modeling, angles between the vectors further comprise:
program instructions to compute the angle between each pair of vectors; and
program instructions to determine if the angle between each pair of vectors is less than one degree.

20. The computer system of claim 15, wherein the program instructions to group the reports into similar sets using a maximal cliques process further comprise:
program instructions to create an undirected graph wherein a vertex represents each report;
program instructions to connect a pair of reports, determined to be similar, by an edge;
program instructions to extract one or more separate connected component subgraphs from the undirected graph;

program instructions to determine a maximal clique for each subgraph, wherein each maximal clique represents a set of similar reports;
program instructions to group the reports contained in the maximal clique together; and
program instructions to store cliques into a repository.

* * * * *